R. L. MORGAN.
LOADING AND UNLOADING DEVICE.
APPLICATION FILED APR. 3, 1912.
1,048,722.  Patented Dec. 31, 1912.
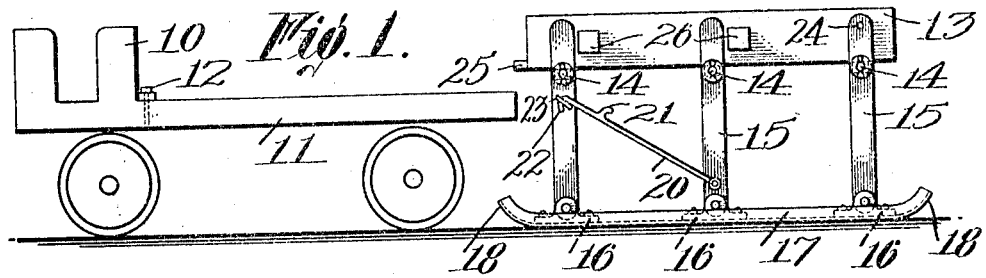
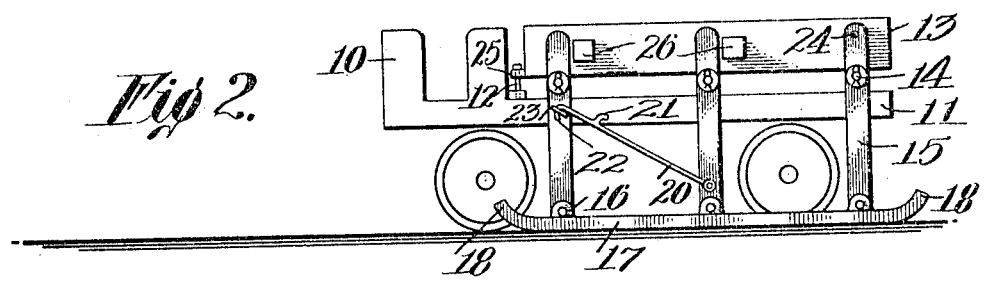
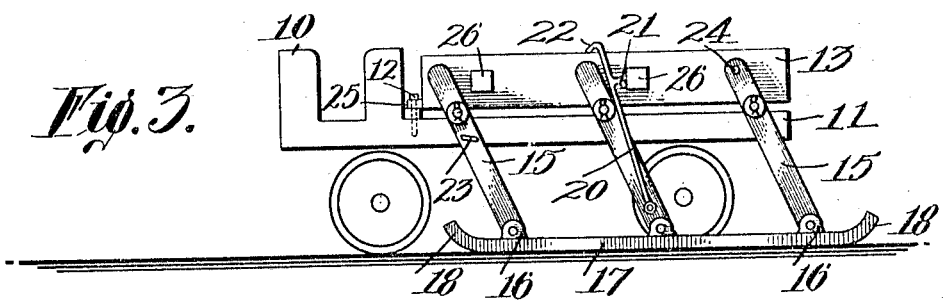
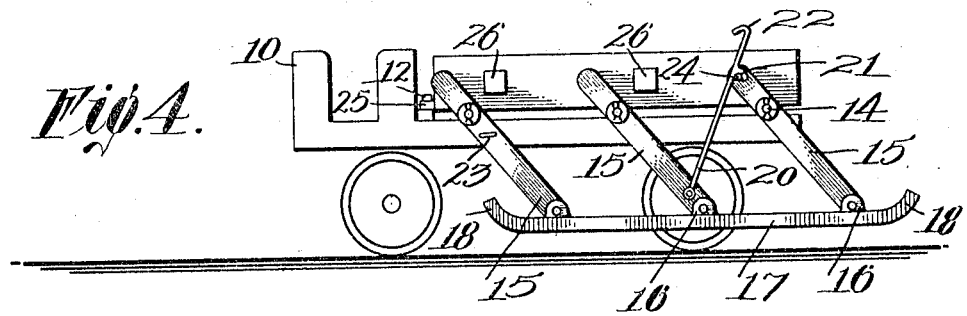
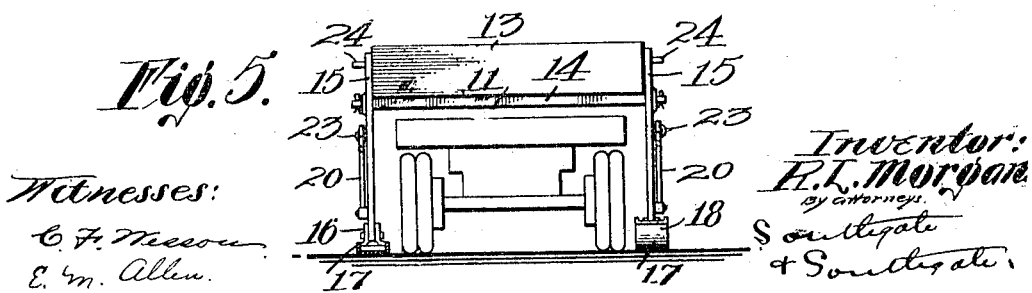

UNITED STATES PATENT OFFICE.

RALPH L. MORGAN, OF WORCESTER, MASSACHUSETTS.

LOADING AND UNLOADING DEVICE.

1,048,722.  Specification of Letters Patent.  Patented Dec. 31, 1912.

Application filed April 3, 1912. Serial No. 688,342.

*To all whom it may concern:*

Be it known that I, RALPH L. MORGAN, a citizen of the United States, residing at Worcester, in the county of Worcester and State of Massachusetts, have invented a new and useful Loading and Unloading Device, of which the following is a specification.

This invention relates to a device by which motor trucks and other vehicles can conveniently be loaded and unloaded.

The principal objects of the invention are to provide a simple construction by which a load can be removed from a vehicle simply by the longitudinal motion of the vehicle itself without manual assistance and without raising or lowering the vehicle itself; and by which a load can as easily be deposited on the vehicle; also to provide a very simple and inexpensive construction for this purpose having few parts likely to get out of order in use.

Further objects and advantages of the invention will appear hereinafter.

Reference is to be had to the accompanying drawings in which—

Figure 1 is a side elevation of a motor vehicle or truck ready to take on a load from a device constructed in accordance with this invention; Fig. 2 is a similar view showing the parts in the next position in which the load is ready to be deposited on the vehicle; Fig. 3 is a similar view showing the position of the parts when the load has been deposited on the vehicle; Fig. 4 is a similar view showing the parts in the position assumed when the vehicle is transporting the load; and Fig. 5 is an end elevation.

The invention is shown as being used in connection with a motor truck 10 of well known type having a horizontal platform 11 without obstruction from end to end. This truck is shown as provided with a pin 12, the purpose of which will appear hereinafter.

The truck is intended to carry its load in a removable body or receptacle 13. In the form illustrated this body is provided with a plurality of cross rods 14 constituting pivots for a corresponding number of swinging arms 15 located on both sides of the body. At the bottom these arms are provided with castings or forgings 16 to which they are pivoted and by which they are connected with means for keeping the arms always parallel. This means is shown as a pair of runners 17, preferably turned up at the ends at 18 as indicated. Three of the arms 15 are shown, and pivoted to the center one near the bottom is a fastening rod 20 having two hooks 21 and 22. The hook 22 is intended to hook into an eye 23 on one of the end arms when the parts are in the position shown in Figs. 1 and 2, and the hook 21 to hook over a stud 24 at the top of the other end arm when the parts are in the position shown in Fig. 4.

The operation of the device is as follows:—When the body is to be loaded it is set up in the position shown in Fig. 1 with the hook 22 in the eye 23 and the tops of the arms against stops 26. This holds the arms upright and causes the weight of the body to rest on the ends of the arms or runners. In this position the body is higher than the top of the truck platform so that the latter can back under it as shown in Fig. 2. When in this position the pin 12 is applied through a lug 25 on the body to connect the body with the truck. Then the hook 22 is withdrawn from the eye 23 and the truck started forward. This pulls the arms over into the position shown in Fig. 3 and takes the weight of the load off the runners and deposits it on the platform. Then the rod 20 can be reversed and connected with the stud 24 as indicated in Fig. 4 and the parts are in position for the truck to transport the load wherever desired.

In unloading, the first step is for the hook 21 to be disconnected from the stud 24 so as to release the arms and let them drop into the position shown in Fig. 3. Then the vehicle is backed slightly which brings the arms 15 to vertical position as shown in Fig. 2. Now the rod 20 is turned over into the position shown in Fig. 2 to bring the hook 22 into the eye 23 and the pin 12 is withdrawn. It will be seen that the backing of the truck has raised the load off the truck and left it on the arms. Consequently when these operations have been performed the load is supported entirely free from the truck and the truck is at liberty to move out from under the load and perform any other operations which may be desired. It will be seen therefore that the load is deposited on and removed from the truck without any manual operation whatever and the parts are secured in either position by the mere connection of the rod 20 in the desired ways. Thus the power of the truck is used for both the loading and unloading operations in a very simple and convenient way. It will be observed therefore that the invention is not limited to motor trucks, but that it can be applied to other vehicles having unobstructed platforms.

Although I have illustrated and described only a single embodiment of the invention, I am aware that many modifications can be made therein by any person skilled in the art without departing from the scope of the invention as expressed in the claims. Therefore I do not wish to be limited to all the details of construction herein shown and described, but What I do claim is:—

1. In a loading and unloading device, the combination with a truck having a platform, of a removable body or receptacle adapted to rest on said platform, and means independent of the truck, carried by said body or receptacle, and movable up and down by a parallel motion for supporting the body in position above the platform.

2. In a loading and unloading device, the combination with a truck having a platform, of a removable body or receptacle adapted to rest on said platform, and means carried by and supporting the body, and movable upwardly from the platform, for lifting the body therefrom.

3. In a loading and unloading device the combination with a truck having an unobstructed horizontal platform, of a body or receptacle adapted to be received on said platform, means for holding the body or receptacle at an elevation above the top of the platform, whereby the truck can be backed under it, and means whereby the body or receptacle can be connected with the truck and whereby the horizontal forward motion of the truck will cause the weight of the body or receptacle to be deposited on said platform.

4. In a loading and unloading device, the combination with a truck having an unobstructed horizontal platform, of a removable body or receptacle adapted to rest thereon, means connected with said body or receptacle for engaging the ground, and means whereby when the first named means engages the ground the horizontal backing of the truck will cause the body or receptacle to be raised from the platform and its weight to be carried by the first named means.

5. In a loading and unloading device for vehicles, the combination with a vehicle having an unobstructed horizontal platform, of a removable body or receptacle adapted to be supported on said platform, a series of arms pivotally connected with said body and depending therefrom on each side, and means connected with said arms for holding them parallel, said arms being of a length to remain in inclined position when resting on the ground with the body on the platform.

6. In a loading and unloading device for vehicles, the combination with a vehicle having an unobstructed horizontal platform, of a removable body or receptacle adapted to be supported on said platform, a series of arms pivotally connected with said body and depending therefrom on each side, means connected with said arms at the bottom thereof and adapted to rest on the ground when the arms are free to swing downwardly for holding the arms parallel with each other, said arms being of a length to remain in inclined position when they rest on the ground and the body is on the platform, and means for removably securing the body to the vehicle near the front thereof.

7. In a loading and unloading device for vehicles, the combination with a vehicle having a platform, of a removable body or receptacle adapted to be supported on said platform, a series of arms pivotally connected with said body and depending therefrom on each side, a pair of runners connected with said arms at the bottom thereof and adapted to rest on the ground when the arms are free to swing downwardly, said arms being of a length to remain in inclined position when the runners rest on the ground and the body is on the platform, and means for holding said runners in elevated position while the body is on the vehicle.

8. In a loading and unloading device for vehicles, the combination with a vehicle having a platform, of a removable body or receptacle adapted to be supported on said platform, a series of arms pivotally connected with said body and depending therefrom on each side, a pair of runners connected with said arms at the bottom thereof, and adapted to rest on the ground when the arms are free to swing downwardly, said arms being of a length to remain in inclined position when the runners rest on the ground and the body is on the platform, and means for holding said arms in vertical position to cause the runners and arms to support the body.

9. In a device for loading and unloading vehicles, the combination with a vehicle having a platform, of a body or receptacle adapted to rest thereon having a series of arms pivoted on each side thereof and depending therefrom, and means for keeping said arms parallel, said arms being longer than the distance of the top of said platform above the ground, whereby when said arms are brought to vertical position the body or receptacle will be held in a position higher than the top of said platform.

10. In a device for loading and unloading vehicles, the combination with a vehicle having a platform, of a body or receptacle adapted to rest thereon having a series of parallel arms pivoted on each side thereof and depending therefrom, said arms being longer than the distance of the top of said platform above the ground, a pair of runners pivotally connected with the bottom ends of said arms, whereby when said arms are brought to vertical position the body or receptacle will be held in a position higher than the top of said platform, and means for holding said runners in elevated position while the body is on the truck.

11. In a device of the class described, the combination of a removable body or receptacle for a truck platform, with a series of horizontal transverse rods on the bottom thereof, an arm pivoted at each end of each rod and depending therefrom, and means on each side pivoted to said arms for holding the arms parallel.

12. In a device of the class described, the combination of a removable body or receptacle for a truck platform, with a series of horizontal transverse rods on the bottom thereof, an arm pivoted at each end of each rod and depending therefrom, means on each side pivoted to the lower ends of said arms, for holding them parallel, and a rod connecting one of said arms with another for holding them in vertical position.

13. In a device of the class described, the combination of a removable body or receptacle for a truck platform, of a series of horizontal transverse rods on the bottom thereof, an arm pivoted at each end of each rod and depending therefrom, means on each side for holding said arms parallel, and a rod connecting one of said arms with another to hold the arms back in inclined position and their lower ends elevated.

14. In a device of the class described, the combination of a removable body or receptacle for a truck platform, of a series of horizontal transverse rods on the bottom thereof, an arm pivoted at each end of each rod and depending therefrom, a rod pivoted to the bottom of one of said arms and having hooks on opposite sides thereof, one adapted to engage an arm in front of the one to which the rod is pivoted to hold the arms in vertical position and the other adapted to engage an arm at the rear to hold the arms in inclined position.

In testimony whereof I have hereunto set my hand, in the presence of two subscribing witnesses.

RALPH L. MORGAN.

Witnesses:
    EDWIN CHURCHFELD, Jr.,
    ANTHONY G. JACKSON.